C. F. BURGESS.
DRY CELL.
APPLICATION FILED MAR. 16, 1916.
1,302,304.
Patented Apr. 29, 1919.
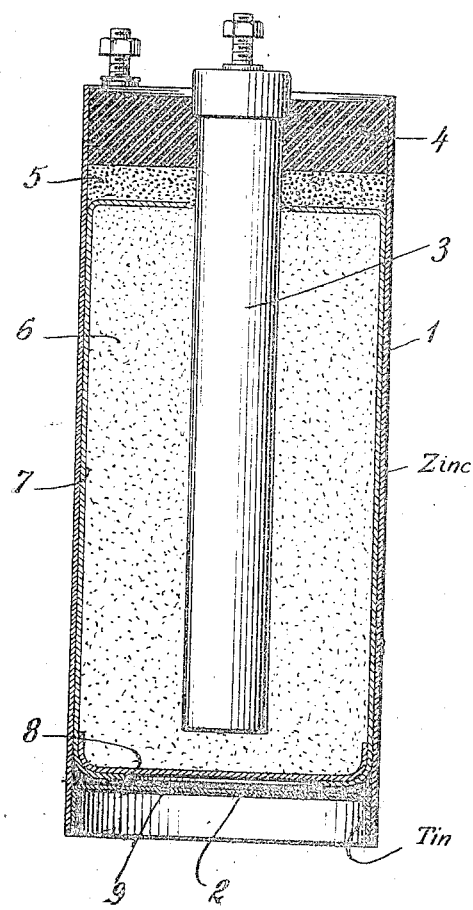
Inventor
Charles F. Burgess
By his Attorneys

UNITED STATES PATENT OFFICE.

CHARLES F. BURGESS, OF MADISON, WISCONSIN, ASSIGNOR, BY MESNE ASSIGNMENTS, TO BURGESS BATTERY COMPANY, OF MADISON, WISCONSIN, A CORPORATION OF WISCONSIN.

DRY CELL.

1,302,304.      Specification of Letters Patent.      Patented Apr. 29, 1919.

Application filed March 16, 1916. Serial No. 84,595.

*To all whom it may concern:*

Be it known that I, CHARLES F. BURGESS, a citizen of the United States, residing in Madison, county of Dane, State of Wisconsin, have invented certain new and useful Improvements in Dry Cells; and I do hereby declare the following to be a full, clear, and exact description of the invention, such as will enable others skilled in the art to which it appertains to make and use the same.

In the manufacture of galvanic batteries of the type commonly called "dry cells," it is customary to use a zinc electrode of such shape that it may serve as a container for the other elements of the cell. The container is usually in the form of a tube closed at the bottom, both the tube and the bottom being of zinc.

I have discovered that a highly satisfactory dry cell may be made by having a zinc electrode with a tin bottom forming therewith a container for the other elements of the cell; and I here use the term "tin," in a customary way, to include tinplate and terneplate.

The accompanying drawing is a sectional elevation of a dry cell constructed in accordance with my present invention.

The zinc electrode 1 is of tubular shape, as in common practice, and the bottom 2 is of tin punched from tinplate or terneplate and shaped with a flange to fit snugly within the zinc tube where it is soldered in place.

The other elements of the cell may be of usual form and composition as shown in the drawing, where 3 is the negative, carbon electrode, 4 the pitch seal, 5 the gas reservoir, 6 the depolarizing mix of manganese dioxid, carbon and graphite and the salammoniac-zinc chlorid electrolyte, 7 the bibulous envelop of blotting paper with a paper bottom 8, and 9 the usual tar paper disk covering the container bottom. This tar paper disk is semi-soluble in the zinc chlorid which forms part of the battery mixture and changes to a gummy mass, as explained in U. S. Patent No. 1,032,529, issued to Burgess and Hambuechen, July 16, 1912. Even though the tin be freely exposed to the electrolyte, there is no harmful local action set up between the zinc and the tin.

The tin bottom gives to the cell relatively great strength; the tin is not subject to cracking during punching and shaping, is easy to solder in place and is cheaper than zinc. By its use I effect a saving of four to five dollars per 1,000 cells of the standard size known to the trade as No. 6.

The cell of my present invention is efficient, durable, and of high grade and satisfactorily marketable as such.

I claim:

In the dry cell a metal container exposed to the electrolyte, said container having zinc sides and a tin bottom and an electrolyte and coöperating electrode in said container.

In testimony whereof I affix my signature.

CHARLES F. BURGESS.